United States Patent
Wu et al.

(10) Patent No.: US 7,394,588 B2
(45) Date of Patent: *Jul. 1, 2008

(54) WAVELENGTH CONVERTER STRUCTURE AND METHOD FOR PREPARING THE SAME

(75) Inventors: Tso-Lun Wu, Hsinchu (TW); Tze-Chia Lin, Hsinchu (TW); Ming-Hsien Chou, Hsinchu (TW)

(73) Assignee: HC Photonics Corp. (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/466,159

(22) Filed: Aug. 22, 2006

(65) Prior Publication Data

US 2008/0049298 A1   Feb. 28, 2008

(51) Int. Cl.
G02F 1/35 (2006.01)
(52) U.S. Cl. .................... 359/326; 359/328
(58) Field of Classification Search ........... 359/326, 359/328
See application file for complete search history.

(56) References Cited

U.S. PATENT DOCUMENTS

| 6,002,515 | A  | 12/1999 | Mizuuchi et al. |
| 6,353,495 | B1 | 3/2002  | Mizuuchi et al. |
| 6,631,231 | B2 | 10/2003 | Mizuuchi et al. |
| 6,836,354 | B2 | 12/2004 | Kato et al. |
| 6,900,928 | B2 * | 5/2005 | Lin et al. .................... 359/326 |

* cited by examiner

*Primary Examiner*—Jennifer Doan
(74) *Attorney, Agent, or Firm*—Connolly Bove Lodge & Hutz LLP; Myron Keith Wyche (57) ABSTRACT

A wavelength converter structure according to one aspect of the present invention comprises a ferroelectric substrate, a ridge positioned on the ferroelectric substrate, a plurality of first domains positioned in the ridge and a plurality of second domains interleaved between the first domains in the ridge. The first domains have a first polarization direction and the second domains have a second polarization direction opposite to the first polarization direction. The refraction index of the ferroelectric substrate is different from the refraction index of the ridge. The ridge may include a rectangular portion, a taper portion, or a taper portion and a rectangular portion connected to the taper portion.

20 Claims, 9 Drawing Sheets

WAVELENGTH CONVERTER STRUCTURE AND METHOD FOR PREPARING THE SAME

BACKGROUND OF THE INVENTION (A) Field of the Invention

The present invention relates to a wavelength converter structure and method for preparing the same, and more particularly, to a wavelength converter structure including a ridge waveguide having a periodic poling region and method for preparing the same.

(B) Description of the Related Art

The periodic poling structure, formed on a ferroelectric single crystal such as lithium niobate, may be widely used in the optical fields such as optical storage and optical measurement. There are several methods for preparing the periodic poling structure, such as proton-exchanging, the electron beam-scanning method and the electric voltage applying method.

U.S. Pat. No. 6,002,515 discloses a method for manufacturing a polarization inversion part on a ferroelectric crystal substrate. The polarization inversion part is prepared by steps of forming a polarization inversion part by applying a voltage in the polarization direction of the ferroelectric crystal substrate, conducting a heat treatment for reducing an internal electric field generated in the substrate by having applied the voltage, and then reinverting polarization in a part of the polarization inversion part by applying a reverse direction voltage against the voltage that was already applied. In other words, the method for preparing a polarization inversion part disclosed in U.S. Pat. No. 6,002,515 requires performing the application of electric voltage twice.

U.S. Pat. No. 6,353,495 discloses a method for forming an optical waveguide element. The disclosed method forms a convex ridge portion having a concave portion on a ferroelectric single crystalline substrate, and a ferroelectric single crystalline film is then formed in the concave portion. A comb-shaped electrode and a uniform electrode are formed on a main surface of the ferroelectric single crystalline substrate, and electric voltage is applied to these two electrodes to form a ferroelectric domain-inverted structure in the film in the concave portion.

U.S. Pat. No. 6,836,354 discloses a method for producing an optical waveguide by irradiating a laser beam onto an oxide single crystal material. The laser beam is irradiated onto an oxide single crystal to form an optical waveguide portion defined by laser working faces, which are then subjected to a wet etching process using, for example, a strong alkaline solution.

U.S. Pat. No. 6,631,231 discloses a method for preparing an Optical waveguide element. A ridge-type optical waveguide is joined to a surface of a substrate via a joining layer made of an amorphous material. Two grooves are formed to shape an optical waveguide of a ridge type structure by using a dicing device or a laser working device, and a machining like dicing is preferred.

SUMMARY OF THE INVENTION

One aspect of the present invention provides a wavelength converter structure including a ridge waveguide having a periodic poling region and method for preparing the same.

A wavelength converter structure according to this aspect of the present invention comprises a ferroelectric substrate, a ridge positioned on the ferroelectric substrate, a plurality of first domains positioned in the ridge and a plurality of second domains interleaved between the first domains in the ridge. The first domains have a first polarization direction and the second domains have a second polarization direction opposite to the first polarization direction. The refraction index of the ferroelectric substrate is different from the refraction index of the ridge. The ridge may include a rectangular portion, a taper portion, or a taper portion and a rectangular portion connected to the taper portion.

Another aspect of the present invention provides a method for preparing a wavelength converter structure comprising the steps of forming a periodic poling element including a ferroelectric substrate and a periodic poling region positioned in the ferroelectric substrate, and forming a ridge waveguide including the periodic poling region in the ferroelectric substrate from the periodic poling element by removing a portion of the ferroelectric substrate outside the periodic poling region.

One embodiment for forming the periodic poling element fabricates a trench in the ferroelectric substrate, a conductive block in the trench and an interdigital electrode on the surface of the ferroelectric substrate. Subsequently, predetermined voltages are applied to the interdigital electrode and the conductive block such that a plurality of first domains having a first polarization direction and a plurality of second domains interleaved between the first domains are formed in the ferroelectric substrate between the interdigital electrode and the trench. The first domains and the second domains consist of the periodic poling region, and the second domain has a second polarization direction substantially opposite to the first polarization direction.

Another embodiment for forming the periodic poling element fabricates a first interdigital electrode and a second interdigital electrode on a top surface of the ferroelectric substrate and a conductive block on a bottom surface of the ferroelectric substrate. Subsequently, predetermined voltages are applied to the first interdigital electrode, the second interdigital electrode and the conductive block to form the periodic poling region in the ferroelectric substrate.

One embodiment for forming a ridge waveguide including the periodic poling region comprises steps of removing a portion of the ferroelectric substrate outside the periodic poling region to form a ridge, and changing the refraction index of the ridge to form ridge waveguide. In addition, the step of forming a ridge waveguide including the periodic poling region removes a portion of the ferroelectric substrate to form two concavities at two sides of the periodic poling region, joins the top surface of the ferroelectric substrate onto a first substrate, removes a portion of the ferroelectric substrate above the two concavities to form a ridge including the periodic poling region.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
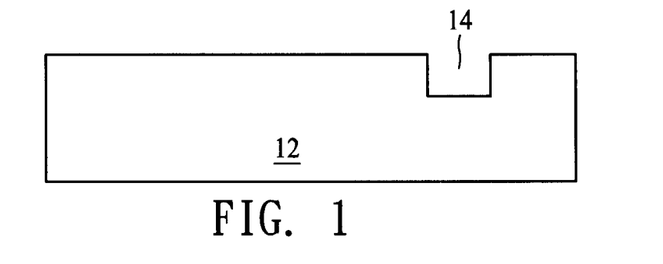
FIG. 1 to FIG. 7 illustrate a method for preparing a wavelength converter structure in a ferroelectric substrate according a first embodiment of the present invention.
Figure 2:
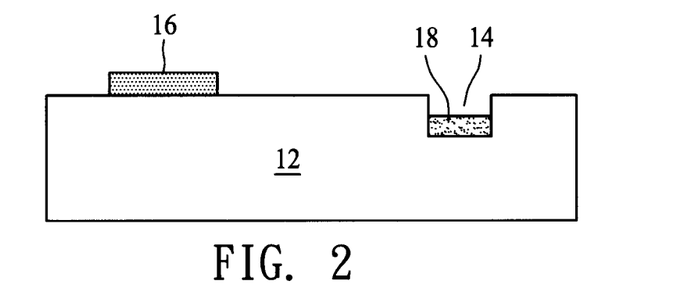

FIG. 1 to FIG. 7 illustrate a method for preparing a wavelength converter structure 10 in a ferroelectric substrate 12 such as a wafer according a first embodiment of the present invention. A portion of the ferroelectric substrate 12 is removed by lithographic and etching processes to form a trench 14, and a conductive layer (not shown in the drawings) is then formed on the ferroelectric substrate 12 by deposition process. Subsequently, a portion of the conductive layer is removed from the surface of the ferroelectric substrate 12 by lithographic and etching processes to form an interdigital electrode 16 and a conductive block 18 inside the trench 14, as shown in FIG. 2. The interdigital electrode 16 and the conductive block 18 can be made of metal such as nickel or titanium.

In addition, the interdigital electrode 16 can be prepared by forming a patterning layer such as photoresist layer on the surface of the ferroelectric substrate 12, and the patterning layer covers a portion of the surface of the ferroelectric substrate 12 and exposes a predetermined surface of the ferroelectric substrate 12 where the interdigital electrode 16 is subsequently formed. A conductive layer is then formed to cover the patterning layer and the exposed surface of the ferroelectric substrate 12, and a lift off process is then performed to remove the patterning layer together with the conductive layer thereon to complete the interdigital electrode 16.

Figure 3:
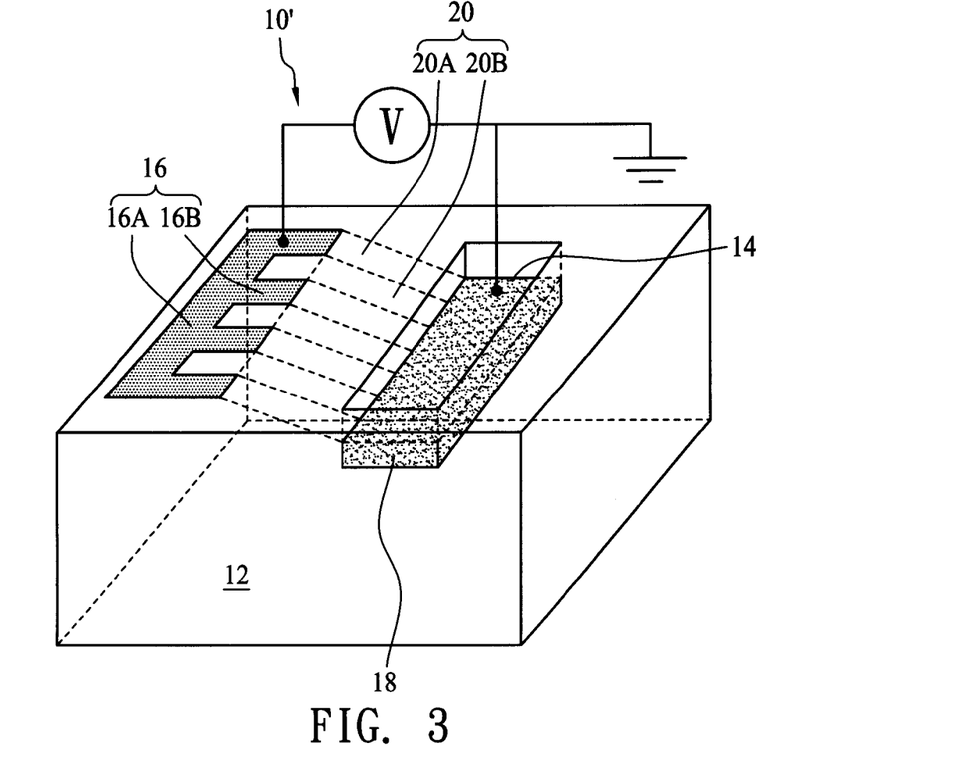

Referring to FIG. 3, predetermined voltages are applied to the interdigital electrode 16 and the conductive block 18 inside the ferroelectric substrate 12 to form a periodic poling element 10', which includes a plurality of first domains 20A having a first polarization direction and a plurality of second domains 20B interleaved between the first domains 20A. Since the conductive block 18 is positioned inside the ferroelectric substrate 12, the first domains 20A and the second domains 20B are distanced from the surface of ferroelectric substrate 12, i.e., they are formed in the ferroelectric substrate 12 between the interdigital electrode 16 and the trench 14. The first domains 20A and the second domains 20B consist of a periodic poling region 20, and the second domain 20B has a second polarization direction substantially opposite to the first polarization direction. Particularly, the interdigital electrode 16 includes a body potion 16A and a plurality of finger portions 16B pointing to the trench 14, and each finger portion 16B has a free end and the first domains 20A are positioned between the free end and the trench 14.

Figure 4:
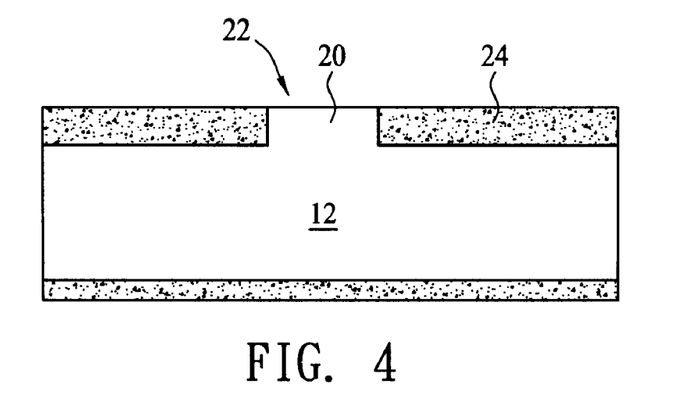
Figure 5:
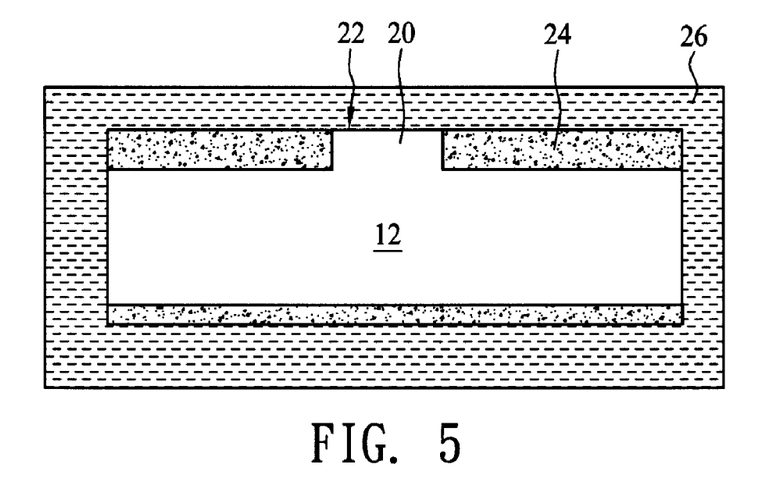
Figure 6:
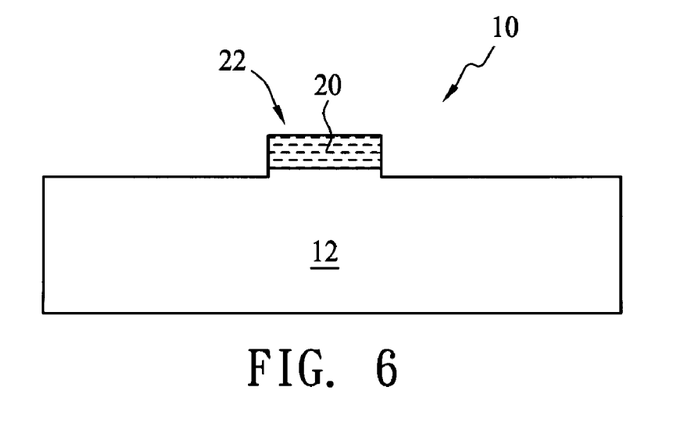

Referring to FIG. 4, a portion of the ferroelectric substrate 12 outside the periodic poling region 20 is removed by lithographic and etching processes to form a taper ridge 22, for example, forming a photoresist layer covering a predetermined portion such as a taper portion of the periodic poling region 20 by lithographic process and then etching the ferroelectric substrate 12 not covered by the photoresist layer. A diffusion isolator 24 such as a silicon oxide layer is then formed on the surface of the ferroelectric substrate 12, wherein the diffusion isolator 24 exposes the top surface of the taper ridge 22. Subsequently, a dipping process is performed in a diffusion solution 26 such as benzoic acid including protons such that protons diffuse into the taper ridge 22 not covered by the diffusion isolator 24 to complete the wavelength converter structure 10, as shown in FIG. 6.

Figure 7:
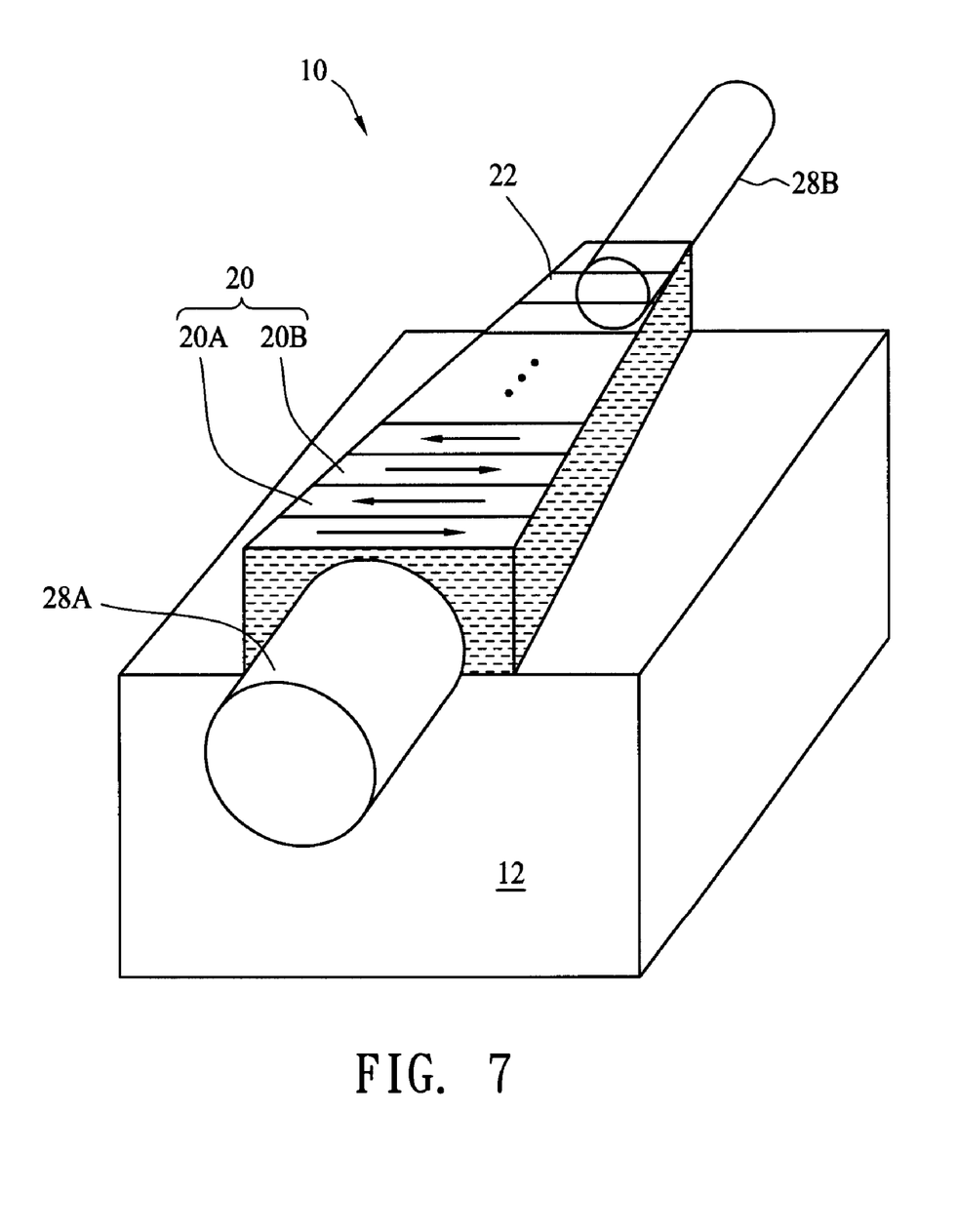
Figure 8:
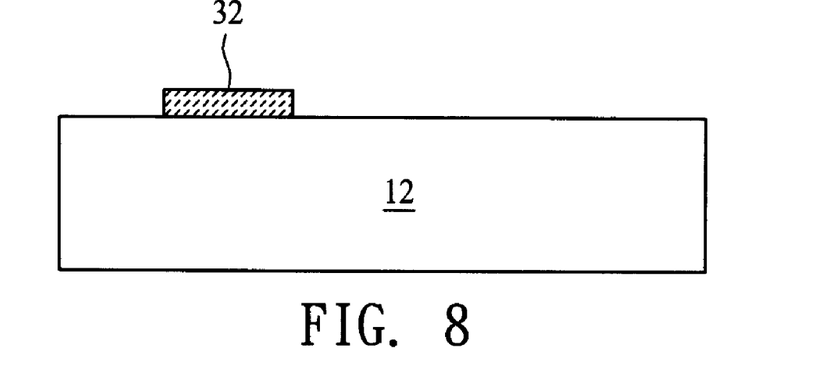
FIG. 8 to FIG. 12 illustrate a method for preparing a wavelength converter structure according to a second embodiment of the present invention.

Referring to FIG. 7, the diffusion of protons into the taper ridge 22 changes the refraction index of the taper ridge 22 such that the refraction index of the ferroelectric substrate 12 is different from that of the taper ridge 22. Consequently, the wavelength converter structure 10 can be used to convert a light beam 28A having a first wavelength into a light beam 28B having a second wavelength different from that of the first wavelength by the nonlinear frequency conversion such as second harmonic generation (SHG) of the periodic poling region 20.

In particular, the width of the taper ridge 22 varies along a propagation direction of the light beam.

Figure 9:
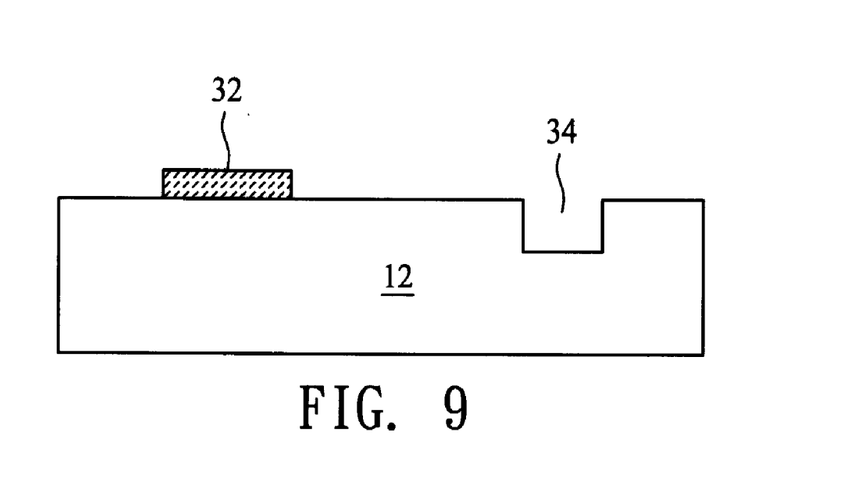

FIG. 8 to FIG. 12 illustrate a method for preparing a wavelength converter structure 30 according to a second embodiment of the present invention. A conductive layer (not shown in the drawings) is formed on the ferroelectric substrate 12 by deposition process and a portion of the conductive layer is then removed from the surface of the ferroelectric substrate 12 to form an interdigital electrode 32. Subsequently, a portion of the ferroelectric substrate 12 is removed to form a trench 34, as shown in FIG. 9.

Figure 10:
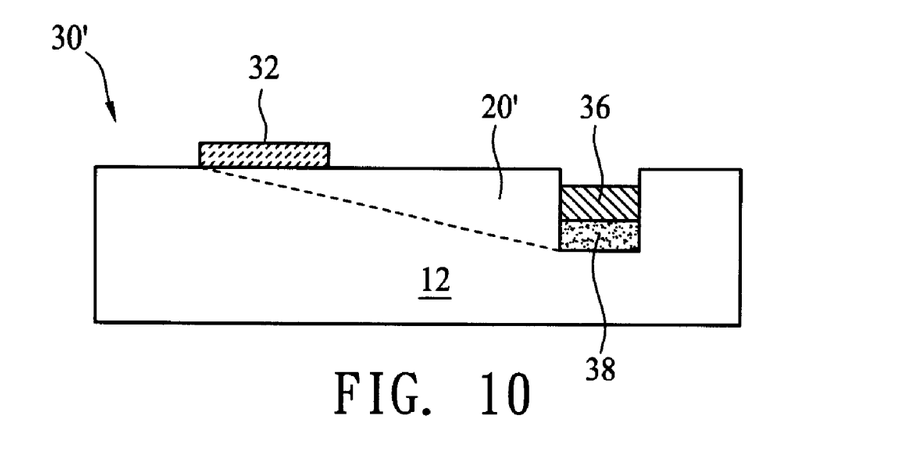

Referring to FIG. 10, a metal layer 36 is formed in the trench 34 and a thermal treating process is performed such that metal ions diffuse from the metal layer 34 into the ferroelectric substrate 12 to form a conductive block 38 inside the ferroelectric substrate 12 below the bottom surface of the trench 34. Subsequently, predetermined voltages are applied to the interdigital electrode 32 and the conductive block 38 to form a periodic poling element 30' having a periodic poling region 20', similar to that shown in FIG. 3.

Figure 11:
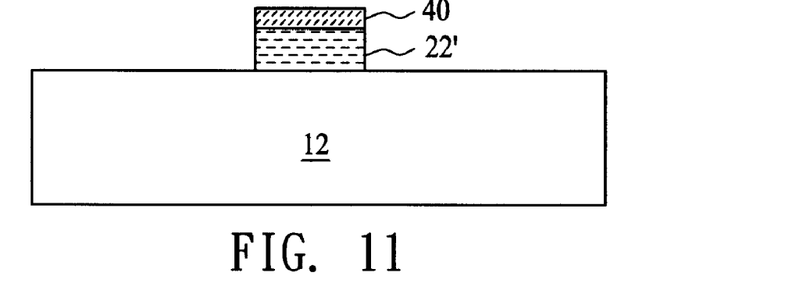
Figure 12:
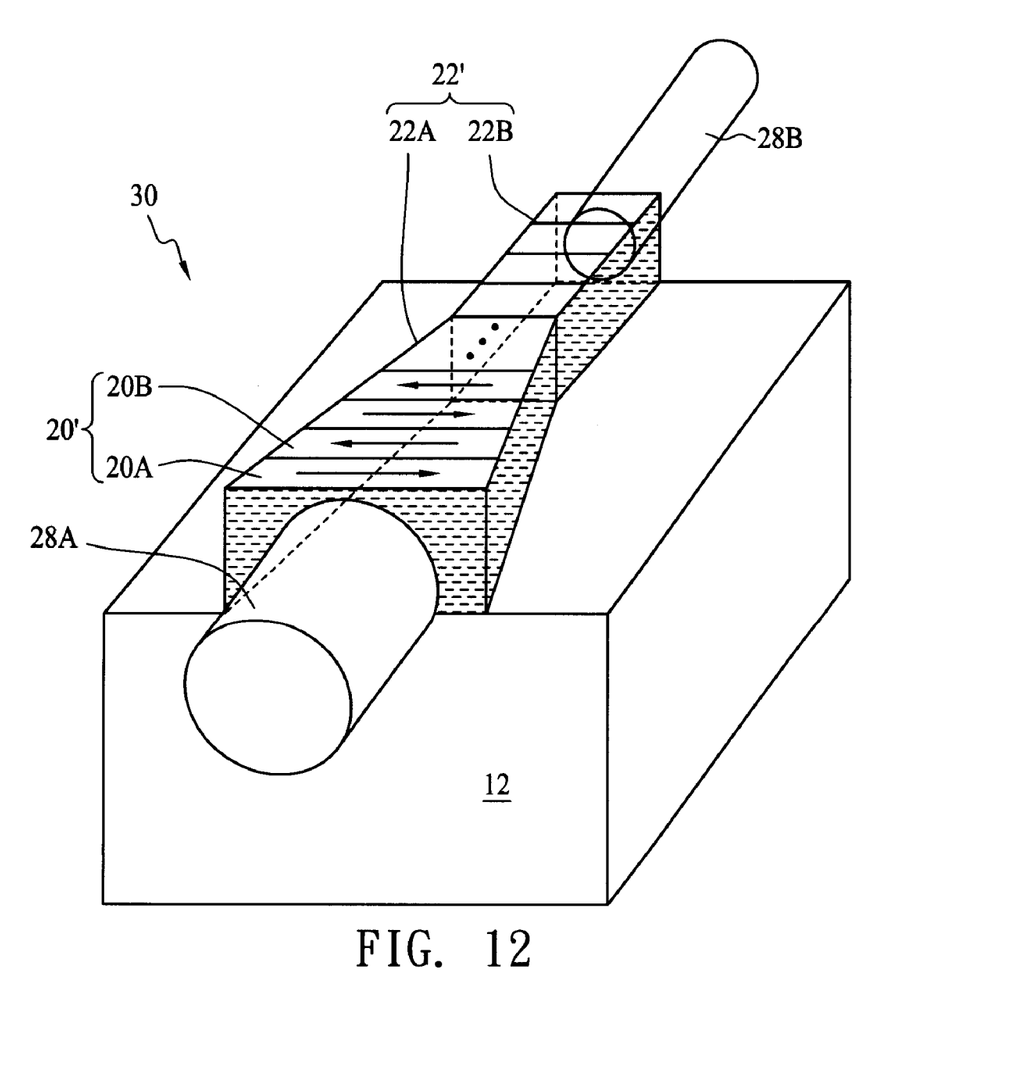

Referring to FIG. 11, a portion of the ferroelectric substrate 12 outside the periodic poling region 20' is removed by lithographic and etching processes to form a ridge 22'. Subsequently, a metal layer 40 is formed on the ridge 22', and a thermal treating process is then performed such that metal ions diffuse from the metal layer 40 into the ridge 22' to complete the wavelength converter structure 30, as shown in FIG. 12. Particularly, the ridge 22' includes a taper portion 22A and a rectangular portion 22B, and the refraction index of the rectangular portion 22B is substantially the same as the refraction index of the taper portion 22A. The taper portion 22A has a first end and a second end, the cross-sectional area of the first end is smaller than the cross-sectional area of the second end, and the rectangular portion 22B connects to the first end of the taper portion 22A. In addition, another rectangular portion (not shown in the drawing) may be formed at the second end of the taper portion 22A.

The diffusion of metal ions into the ridge 22' changes the refraction index of the ridge 22' such that the refraction index of the ferroelectric substrate 12 is different from that of the ridge 22'. Consequently, the wavelength converter structure 30 can be used to convert a light beam 28A having a first wavelength into a light beam 28B having a second wavelength different from the first wavelength by the nonlinear frequency conversion such as second harmonic generation (SHG) of the periodic poling region 20'. Further, the wavelength converter structure 30 can also be used as a filter to eliminate some propagation modes of the light beam 28A.

FIG. 13 to FIG. 17 illustrate a method for preparing a wavelength converter structure 50 according to a third embodiment of the present invention. A first interdigital electrode 52 and a second interdigital electrode 54 are formed on a top surface of the ferroelectric substrate 12, and a conductive block 56 such as a conductive layer is formed on a bottom surface of the ferroelectric substrate 12 by deposition and etching processes. Particularly, the second interdigital electrode 54 is positioned on the top surface as a mirror image of the first interdigital electrode 52, i.e., the finger portion of the first interdigital electrode 52 directs to that of the second interdigital electrode 54.

Figure 14:
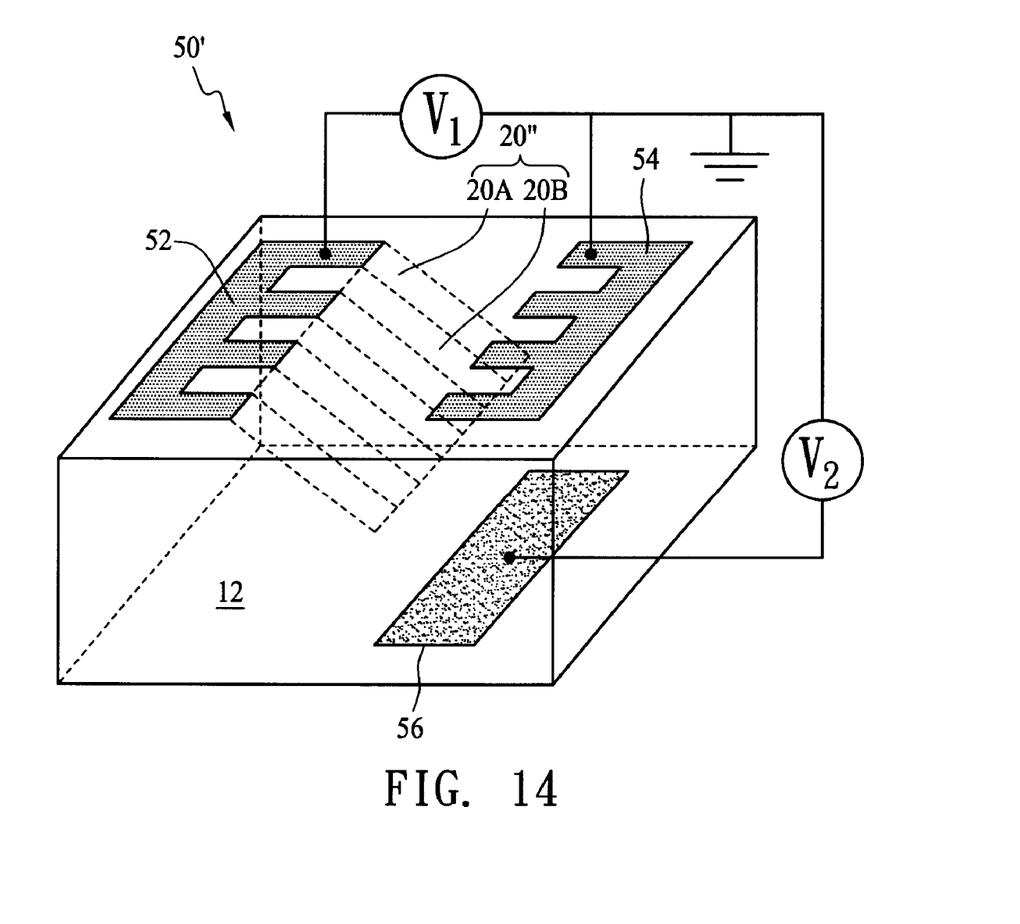
Figure 15:
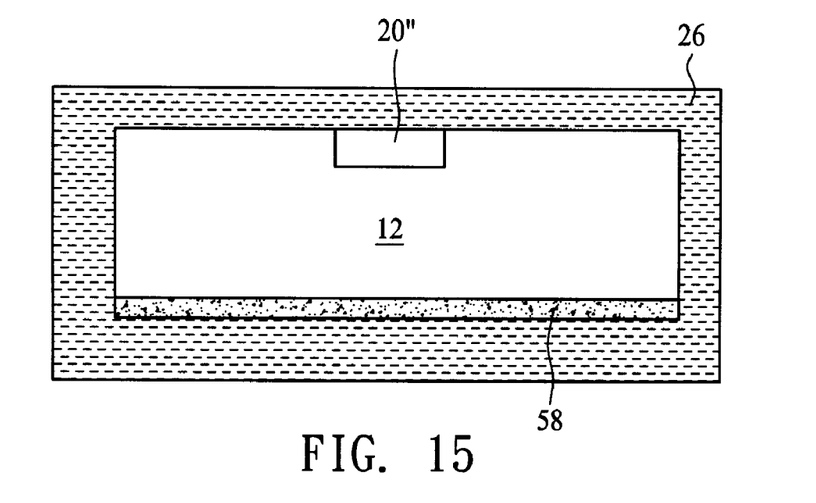

Referring to FIG. 14, predetermined voltages are applied to the first interdigital electrode 52, the second interdigital electrode 54 and the conductive block 56 to form a periodic poling element 50' having a periodic poling region 20" in the ferroelectric substrate 12. Since the finger portion of the first interdigital electrode 52 directs to that of the second interdigital electrode 54, the differentiation of the first domain 20A and the second domain 20B is more distinct than that shown in FIG. 3 due to the distinct electric fields distributed between the first interdigital electrode 52 and the second interdigital electrode 54 by applying the predetermined voltage. The first interdigital electrode 52, the second interdigital electrode 54 and the conductive block 56 are removed from the ferroelectric substrate 12, a diffusion isolator 58 is then formed on the bottom surface of the ferroelectric substrate 12, and a dipping process is then performed in a diffusion solution 26, as shown in FIG. 15.

Figure 16:
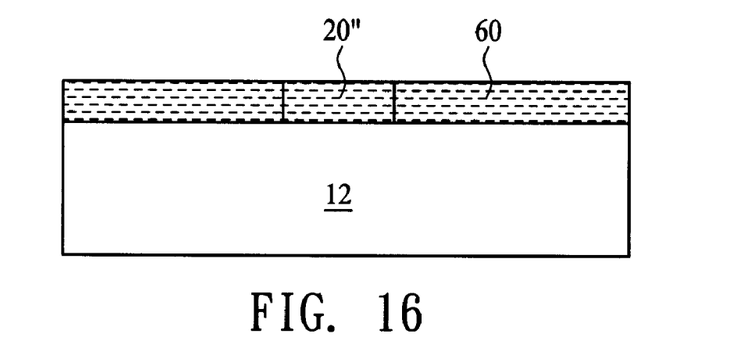
Figure 17:
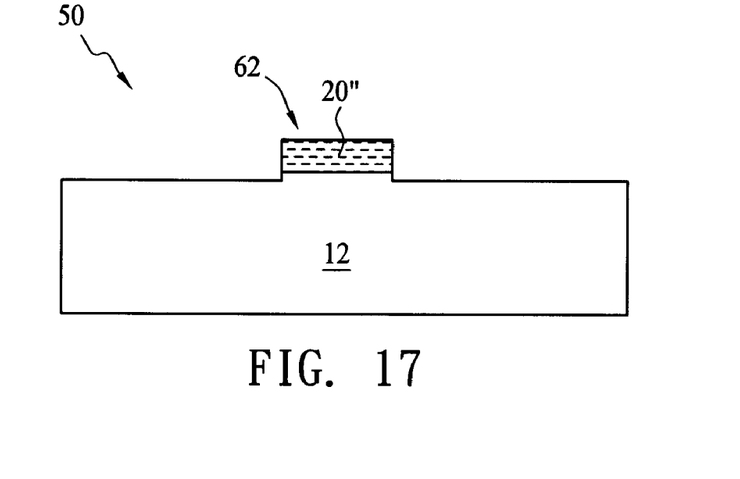
Figure 18:
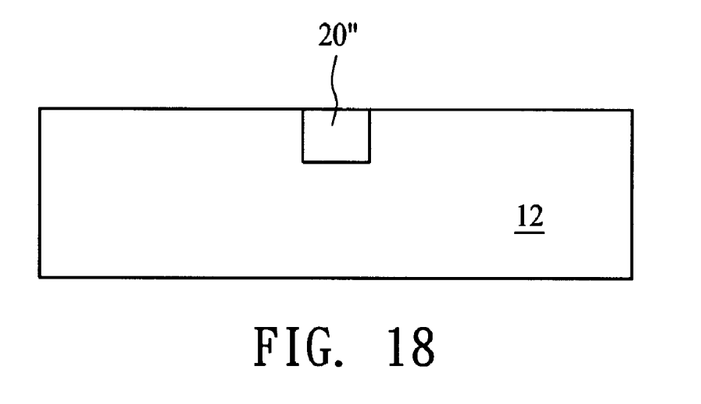
FIG. 18 to FIG. 23 illustrate a method for preparing a wavelength converter structure according to a fourth embodiment of the present invention

Referring to FIG. 16, protons in the diffusion solution 26 diffuse into the ferroelectric substrate 12 in the dipping process to form a diffusion region 60 on the top surface of the ferroelectric substrate 12. Subsequently, an etching process is performed to remove a portion of the ferroelectric substrate 12 outside the periodic poling region 20" to complete the wavelength converter structure 50 having a ridge 62, which may have a shape like the ridge 22 in FIG. 7 or the ridge 22' in FIG. 12.

Figure 13:
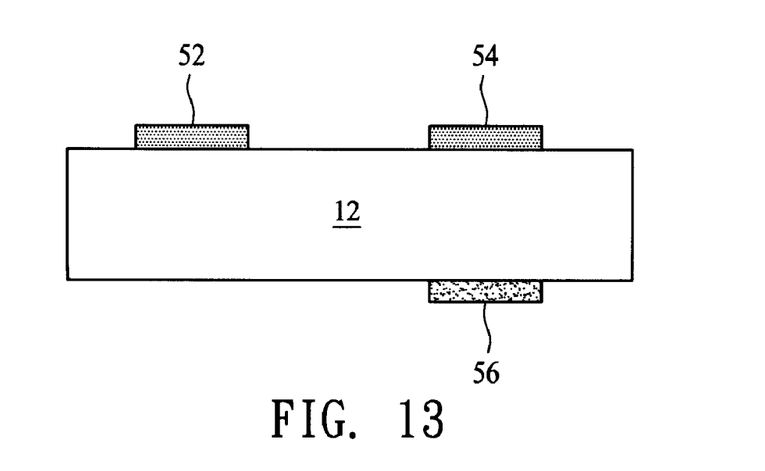
FIG. 13 to FIG. 17 illustrate a method for preparing a wavelength converter structure according to a third embodiment of the present invention.
Figure 19:
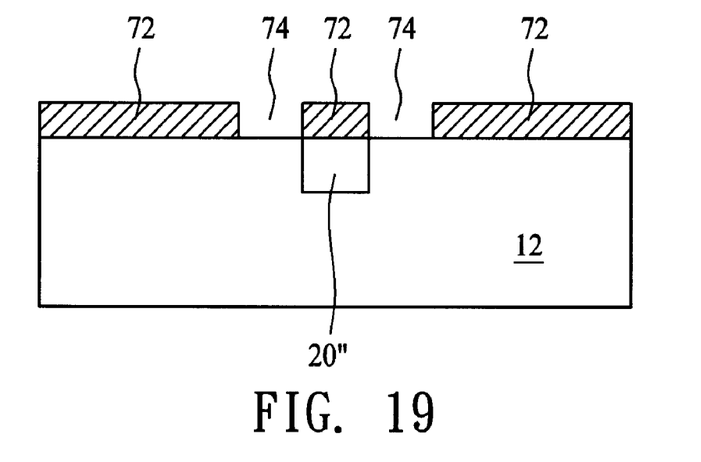

FIG. 18 to FIG. 23 illustrate a method for preparing a wavelength converter structure 70 according to a fourth embodiment of the present invention. The processes shown in FIG. 13 and FIG. 14 are performed and the first interdigital electrode 52, the second interdigital electrode 54 and the conductive block 56 are removed from the ferroelectric substrate 12. Subsequently, a mask layer 72 having two openings 74 is formed on the top surface of the ferroelectric substrate 12 by deposition, and lithographic processes, as shown in FIG. 19.

Figure 20:
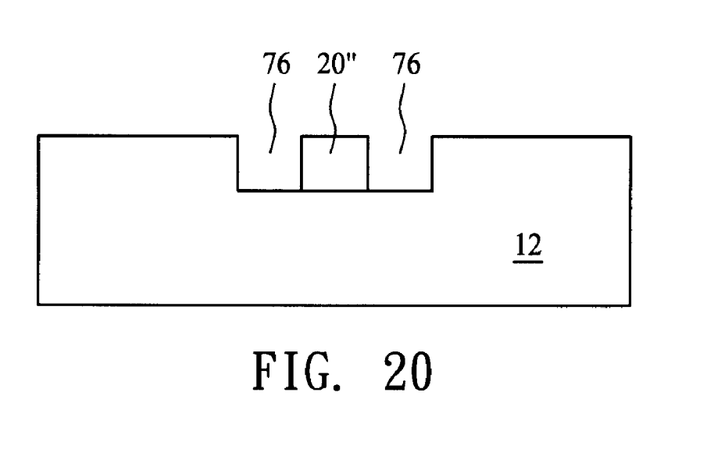
Figure 21:
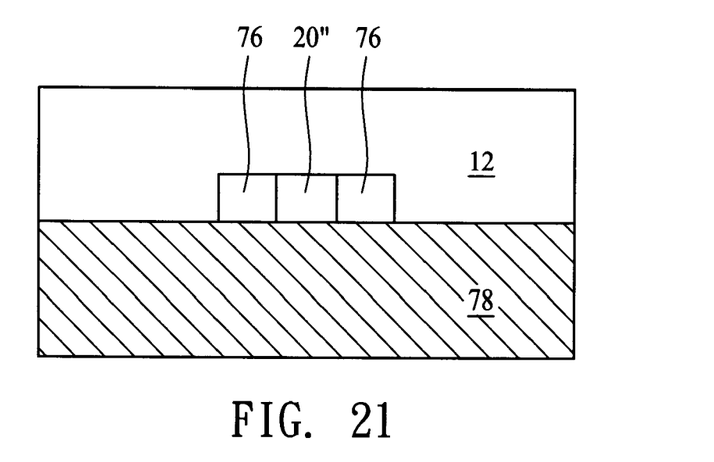

Referring to FIG. 20, an etching process is performed to remove a portion of the ferroelectric substrate 12 not covered by the mask layer 72 to form the two concavities 76 in the ferroelectric substrate 12, and the mask layer 72 is then removed. Subsequently, the top surface of the ferroelectric substrate 12 is joined onto another substrate 78, i.e., in an upside down manner, as shown in FIG. 21. The refraction index of the substrate 78 is different from the refraction index of the ferroelectric substrate 12.

Figure 22:
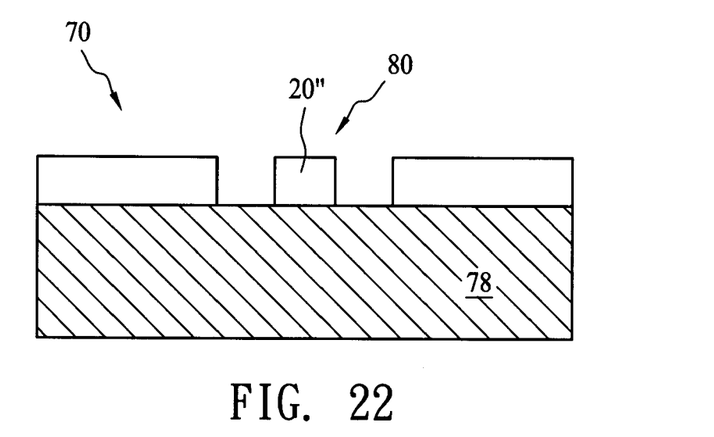
Figure 23:
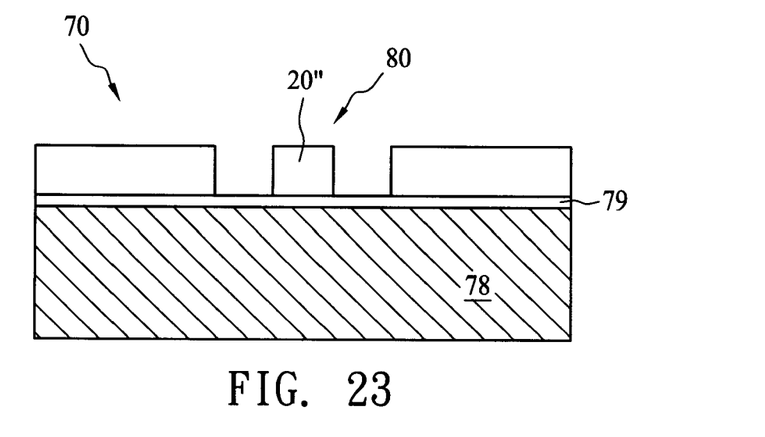

Referring to FIG. 22, a portion of the ferroelectric substrate 12 above the two concavities 76 are removed by polishing process to complete the wavelength converter 70 having a ridge 80 including the periodic poling region 20" on the substrate 78. Since the refraction index of the substrate 78 is different from the refraction index of the ferroelectric substrate 12, the ridge 80 can be used as an optical waveguide. In addition, an adhesive layer may be optionally formed on the surface of the substrate 78, and the top surface of the ferroelectric substrate 12 is then joined onto the substrate 78. In cases where the refraction index of the adhesive layer is different from that of the ferroelectric substrate 12, the substrate 78 may have the same refraction index as the ferroelectric substrate 12, as shown in FIG. 23.

In comparison with the prior art described in the description of the related art, the wavelength converter structure according to the embodiments of the present invention comprises a ridge including a taper portion on the substrate, which can not only be used as a waveguide but also as a filter to eliminate some propagation modes of a penetrating light beam. In other words, none of the prior art discloses a wavelength converter structure having a ridge including a taper portion.

The above-described embodiments of the present invention are intended to be illustrative only. Numerous alternative embodiments may be devised by those skilled in the art without departing from the scope of the following claims.

What is claimed is:

1. A wavelength converter structure, comprising:
   a substrate;
   a ridge including a taper portion positioned on the substrate, and the width of the taper portion varying along a propagation direction of a light beam;
   a plurality of first domains positioned in the ridge, the first domains having a first polarization direction; and
   a plurality of second domains interleaved between the first domains in the ridge, the second domains having a second polarization direction different from that of the first polarization.

2. The wavelength converter structure of claim 1, wherein the second polarization direction is opposite to the first polarization direction.

3. The wavelength converter structure of claim 1, wherein the refraction index of the substrate is different from the refraction index of the ridge.

4. The wavelength converter structure of claim 1, wherein the ridge includes a rectangular portion.

5. The wavelength converter structure of claim 1, wherein the rectangular portion connects to an end of the taper portion.

6. The wavelength converter structure of claim 4, wherein the taper portion has a first end and a second end, the cross-sectional area of the first end is smaller than the cross-sectional area of the second end, and the rectangular portion connects to the first end of the taper portion.

7. The wavelength converter structure of claim 4, wherein the taper portion has a first end and a second end, the cross-sectional area of the first end is larger than the cross-sectional area of the second end, and the rectangular portion connects to the first end of the taper portion.

8. A method for preparing a wavelength converter structure, comprising the steps of:
   forming a periodic poling element including a ferroelectric substrate and a periodic poling region in the ferroelectric substrate; and
   forming a ridge waveguide with a taper portion including the periodic poling region from the periodic poling element, and the width of the taper portion varying along a propagation direction of a light beam.

9. The method for preparing a wavelength converter structure of claim 8, wherein the step of forming a periodic poling element includes:
   removing a portion of the ferroelectric substrate to form a trench;
   depositing a conductive layer on the ferroelectric substrate;
   removing a portion of the conductive layer from the surface of the ferroelectric substrate to form an interdigital electrode on the surface of the ferroelectric substrate and a conductive block in the trench; and
   applying predetermined voltages to the interdigital electrode and the conductive block to form the periodic poling region.

10. The method for preparing a wavelength converter structure of claim 8, wherein the step of forming a periodic poling element includes:
   depositing a conductive layer on the ferroelectric substrate;
   removing a portion of the conductive layer from the surface of the ferroelectric substrate to form an interdigital electrode;
   removing a portion of the ferroelectric substrate to form a trench;

performing a diffusion process to form a conductive block in the ferroelectric substrate below the trench; and applying predetermined voltages to the interdigital electrode and the conductive block to form the periodic poling region.

11. The method for preparing a wavelength converter structure of claim 8, wherein the step of forming a periodic poling element includes:

forming a first interdigital electrode and a second interdigital electrode positioned on a top surface of the ferroelectric substrate and a conductive block on a bottom surface of the ferroelectric substrate; and applying predetermined voltages to the first interdigital electrode, the second interdigital electrode and the conductive block to form the periodic poling region in the ferroelectric substrate.

12. The method for preparing a wavelength converter structure of claim 8, wherein the step of forming a ridge waveguide with a taper portion including the periodic poling region comprises:

forming a ridge with the taper portion by removing a portion of the ferroelectric substrate outside the periodic poling region; and changing the refraction index of the ridge.

13. The method for preparing a wavelength converter structure of claim 12, wherein the step of changing the refraction index of the ridge includes:

forming a diffusion isolator on the surface of the ferroelectric substrate, the diffusion isolator exposing the ridge; and performing a dipping process in a diffusion solution including protons such that protons diffuse into the ridge.

14. The method for preparing a wavelength converter structure of claim 12, wherein the step of changing the refraction index of the ridge includes: forming a metal layer on the ridge; and performing a thermal treating process such that metal ions of the metal layer diffuse into the ridge.

15. The method for preparing a wavelength converter structure of claim 8, wherein the step of forming a ridge waveguide with a taper portion including the periodic poling region comprises:

changing the refraction index of a predetermined portion of the ferroelectric substrate, the portion including the periodic poling region; and forming a ridge with a taper portion by removing a portion of the ferroelectric substrate outside the periodic poling region.

16. The method for preparing a wavelength converter structure of claim 15, wherein the step of changing the refraction index of a predetermined portion of the ferroelectric substrate includes:

forming a diffusion isolator on the surface of the ferroelectric substrate, the diffusion isolator exposing the periodic poling region; and performing a dipping process in a diffusion solution including protons such that protons diffuse into the predetermined portion of the ferroelectric substrate.

17. The method for preparing a wavelength converter structure of claim 8, wherein the step of forming a ridge waveguide including the periodic poling region comprises:

removing a portion of the ferroelectric substrate to form two concavities at two sides of the periodic poling region;

joining a surface with the periodic poling region thereon of the ferroelectric substrate onto a first substrate; and removing a portion of the ferroelectric substrate above the two concavities to form a ridge portion including the periodic poling region.

18. The method for preparing a wavelength converter structure of claim 17, wherein the step of removing a portion of the ferroelectric substrate to form two concavities at two sides of the periodic poling region comprises:

forming a mask layer having two openings on the surface of the ferroelectric substrate; and performing an etching process to remove a portion of the ferroelectric substrate not covered by the mask layer to form the two concavities.

19. The method for preparing a wavelength converter structure of claim 17, wherein the refraction index of the first substrate is different from the refraction index of the ferroelectric substrate.

20. The method for preparing a wavelength converter structure of claim 17, further comprising a step of forming an adhesive layer on a surface of the first substrate before the step of joining the surface of the ferroelectric substrate onto the first substrate.

* * * * *